United States Patent
Winn et al.

(10) Patent No.: US 9,965,572 B1
(45) Date of Patent: May 8, 2018

(54) MULTI-USER CAX ASSEMBLY UPDATER

(71) Applicant: United Technologies Corporation, Hartford, CT (US)

(72) Inventors: Joshua Daniel Winn, Ellington, CT (US); William A. Sowa, Simsbury, CT (US); Michael D. Werkheiser, Petersburg, VA (US); Kurt R. Heinemann, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 667 days.

(21) Appl. No.: 14/596,599

(22) Filed: Jan. 14, 2015

(51) Int. Cl.
*G06F 17/50* (2006.01)

(52) U.S. Cl.
CPC .................................. *G06F 17/50* (2013.01)

(58) Field of Classification Search
None
See application file for complete search history.

(56) References Cited

U.S. PATENT DOCUMENTS

| | | | | |
|---|---|---|---|---|
| 8,229,715 B1* | 7/2012 | Teller | ...................... | G06F 17/50 434/72 |
| 8,566,066 B2* | 10/2013 | Thompson | .............. | G06F 17/50 345/420 |
| 9,122,817 B2* | 9/2015 | Red | ......................... | G06F 17/50 |
| 9,648,059 B2* | 5/2017 | Nysetvold | ............. | H04L 65/403 |
| 2009/0172042 A1* | 7/2009 | Bracha | .................... | G06F 17/50 |
| 2010/0042377 A1* | 2/2010 | Seroussi | ............. | G06F 17/5004 703/1 |
| 2012/0109350 A1* | 5/2012 | Buchowski | ............. | G06F 17/50 700/98 |
| 2012/0317497 A1* | 12/2012 | Red | ......................... | G06F 17/50 715/751 |
| 2013/0144566 A1* | 6/2013 | De Biswas | ........... | G06T 17/005 703/1 |
| 2013/0239011 A1* | 9/2013 | Red | ......................... | G06T 5/00 715/743 |
| 2014/0149882 A1* | 5/2014 | Nysetvold | ............. | H04L 65/403 715/751 |
| 2014/0222387 A1* | 8/2014 | Cannon | ............... | G06F 17/5018 703/1 |

(Continued)

OTHER PUBLICATIONS

Xu, Yue, "A Flexible Context Architecture for a Multi-User GUI," Department of Mechanical Engineering, Brigham Young University, Dec. 2010.

(Continued)

*Primary Examiner* — Isaac T Tecklu
(74) *Attorney, Agent, or Firm* — Carlson, Gaskey & Olds, P.C.

(57) ABSTRACT

A system for collaborating on a component according to an exemplary aspect of the present disclosure includes, among other things, a computing device configured to execute a first multi-user CAx environment including a synchronization module. The synchronization module is configured to selectively cause a display module at a first multi-user CAx environment to display data corresponding to changes to at least one subcomponent feature relating to an assembly model caused by a second multi-user CAx environment during an assembly session when at least one predetermined criterion is met. A method for collaborating on a component design is also disclosed.

20 Claims, 4 Drawing Sheets

(56) References Cited

U.S. PATENT DOCUMENTS

| | | | | |
|---|---|---|---|---|
| 2014/0222919 A1* | 8/2014 | Nysetvold | ............. | H04L 65/403 709/204 |
| 2014/0236550 A1* | 8/2014 | Nysetvold | ............... | G06F 17/50 703/2 |
| 2014/0278269 A1* | 9/2014 | Winn | ...................... | G06F 17/50 703/1 |
| 2014/0317531 A1* | 10/2014 | Bowman, Jr. | ......... | H04L 65/403 715/751 |
| 2016/0021183 A1* | 1/2016 | Bowman | ........... | G06F 17/30876 709/204 |
| 2016/0155161 A1* | 6/2016 | Reisman | ................ | G06Q 10/10 705/26.1 |

OTHER PUBLICATIONS

Red, E., French, D., Hepworth, A., Jensen, G., Stone, B., "Multi-User Computer-Aided Design and Engineering Software Applications," Cloud-Based Design and Manufacturing (CBDM), Springer International Publishing, Jan. 1, 2014, pp. 25-62.

Red, E., Jensen, G., Ryskamp, J., Mix, K., "NXConnect: Multi-User CAx on a Commercial Engineering Software Application," Department of Mechanical Engineering, Brigham Young University, 2010.

\* cited by examiner

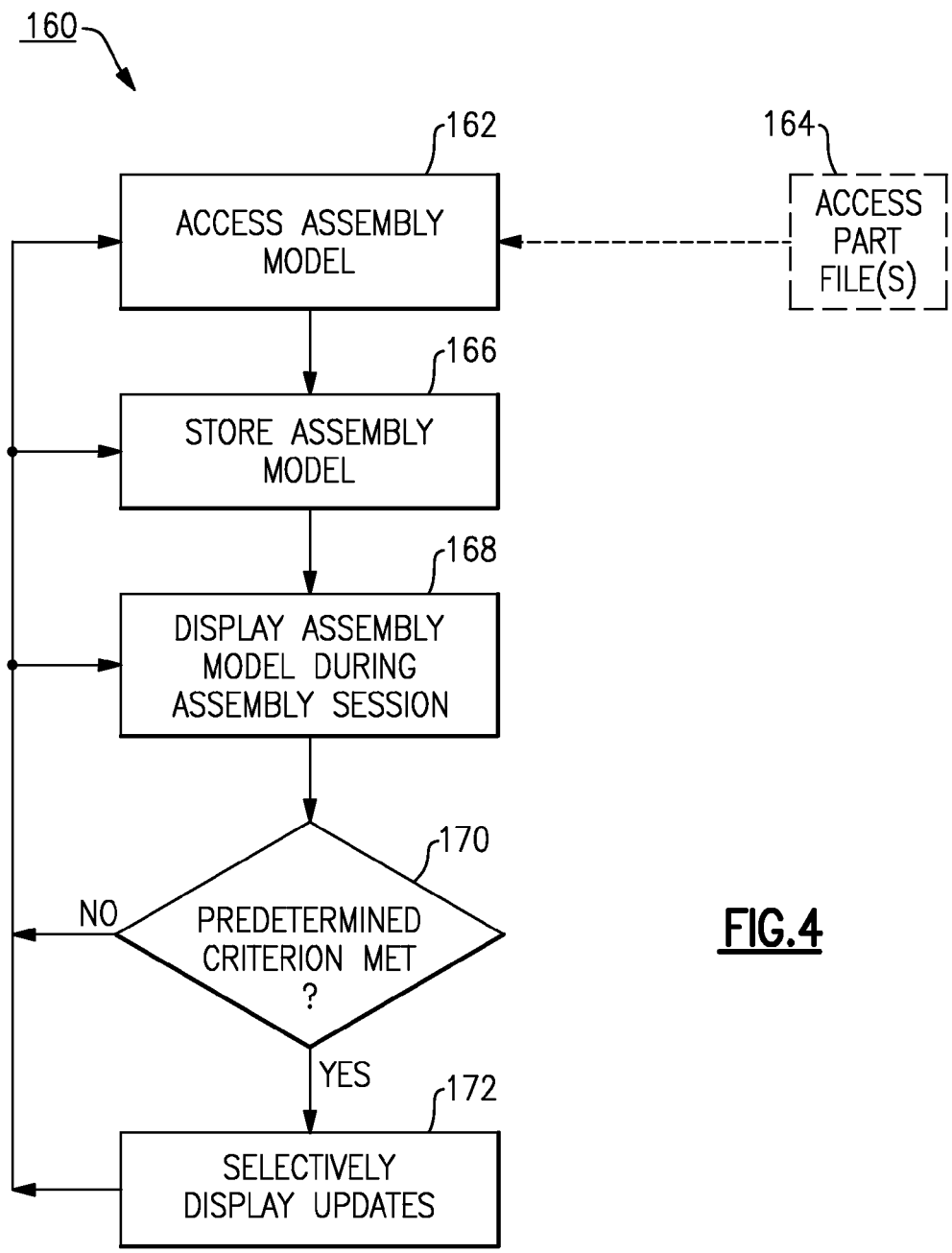

MULTI-USER CAX ASSEMBLY UPDATER

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a first multi-user CAx environment including a synchronization module. The synchronization module is configured to selectively cause a display module at a first multi-user CAx environment to display data corresponding to changes to at least one subcomponent feature relating to an assembly model caused by a second multi-user CAx environment during an assembly session when at least one predetermined criterion is met.

In a further embodiment of any of the foregoing embodiments, the at least subcomponent feature is generated in response to execution of at least one command corresponding to a group of feature types.

A further embodiment of any of the foregoing embodiments includes a data module configured to access data relating to the assembly model from at least one database and configured to store a local copy of the assembly model in the first multi-user CAx environment. The display module is configured to display the assembly model according to the local copy.

In a further embodiment of any of the foregoing embodiments, the data module is configured to cache data corresponding to the assembly model such that accessing the assembly model from the at least one database does not cause data corresponding to the at least one subcomponent feature in the local copy to update unless at least one predefined condition is met.

In a further embodiment of any of the foregoing embodiments, the assembly model corresponds to a first part file, and the at least one subcomponent feature corresponds to a second part file. The second part file is different from the first part file.

In a further embodiment of any of the foregoing embodiments, the at least one predetermined criterion is based on at least one manual selection in the first multi-user CAx environment.

In a further embodiment of any of the foregoing embodiments, the at least one predetermined criterion is based on at least one predetermined time threshold.

In a further embodiment of any of the foregoing embodiments, the synchronization module includes a listening module configured to determine when changes to the at least one subcomponent feature have been made in at least one database configured to store the assembly model.

In a further embodiment of any of the foregoing embodiments, the synchronization module is configured to compare a first time parameter relating to the changes with a second time parameter relating to a local copy of data corresponding to the at least one subcomponent.

In a further embodiment of any of the foregoing embodiments, the at least one predetermined criterion is met when values of the first time parameter and the second time parameter are different.

In a further embodiment of any of the foregoing embodiments, the synchronization module is configured to cause the display module to display at least one visual indicator relating to the changes to the at least one subcomponent feature caused by the second multi-user CAx environment during the assembly session.

In a further embodiment of any of the foregoing embodiments, the visual indicator relates to a geometry of the at least one subcomponent feature.

A system for collaborating on a component according to an example of the present disclosure includes at least one client multi-user CAx environment including a data module and a display module. The data module is configured to store a local copy of data corresponding to an assembly model from at least one database. The assembly model includes at least one component model having at least one subcomponent feature. The display module is configured to display data corresponding to the local copy during an assembly session. A host server includes a processor and a memory storage device. The processor is configured to execute a host multi-user CAx environment having a synchronization module. The memory storage device is configured to store at least one database accessible by the host multi-user CAx environment, and the synchronization module is configured to selectively cause the data module during the assembly session to update the local copy with data corresponding to changes to at least one subcomponent feature in at least one database when at least one predetermined criterion is met.

In a further embodiment of any of the foregoing embodiments, the at least one predetermined criterion corresponds to the at least one client multi-user CAx environment accepting at least one notification from the synchronization module relating to the changes.

In a further embodiment of any of the foregoing embodiments, the at least one subcomponent feature includes a first set of subcomponent features unaffected by the changes and a second set of subcomponent features relating to the changes. The synchronization module is configured to cause the display module to selectively display in a first mode data corresponding to the first set and to selectively display in a second mode data corresponding the second set.

In a further embodiment of any of the foregoing embodiments, at least one of the first mode and the second mode includes at least one visual indicator relating to a geometry of the at least one subcomponent feature.

A method for collaborating on a component design according to an example of the present disclosure includes the steps of storing a local copy of data corresponding to an assembly model from at least one database, the assembly model including at least one component model having at least one subcomponent feature, displaying data corresponding to the local copy at the beginning of an assembly session in a first multi-user CAx environment, and selectively displaying during the assembly session data corresponding to changes to the at least one subcomponent feature caused by a second multi-user CAx environment during the assembly session when at least one predetermined criterion is met.

In a further embodiment of any of the foregoing embodiments, the at least one subcomponent feature includes a first set of subcomponent features unaffected by the changes and a second set of subcomponent features relating to the changes. The step of selectively displaying includes selectively displaying in a first mode data corresponding to the first set and selectively displaying in a second mode data corresponding the second set.

In a further embodiment of any of the foregoing embodiments, at least one of the first mode and the second mode includes at least one visual indicator relating to a geometry of the at least one subcomponent feature.

A further embodiment of any of the foregoing embodiments includes updating the local copy with data corresponding to the changes when the at least one predetermined criterion is met. The step of selectively displaying includes displaying each of the at least one subcomponent according to the local copy.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

FIG. 4 illustrates a process for updating data corresponding to an assembly, according to an embodiment.

DETAILED DESCRIPTION

Figure 1:
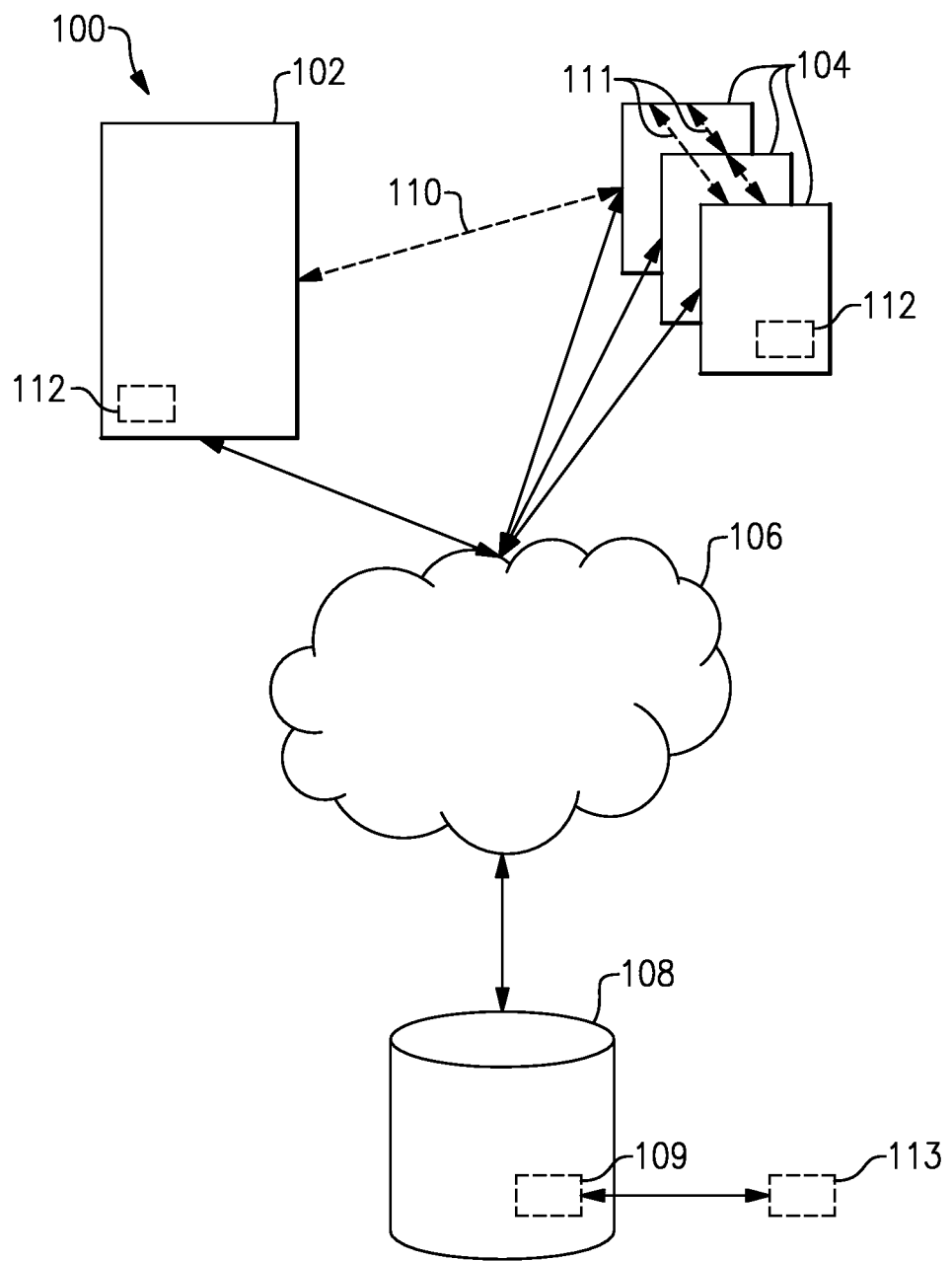
FIG. 1 illustrates a system for a multi-user CAx environment, according to an embodiment.

FIG. 1 illustrates an example computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device.

In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

Figure 2A:
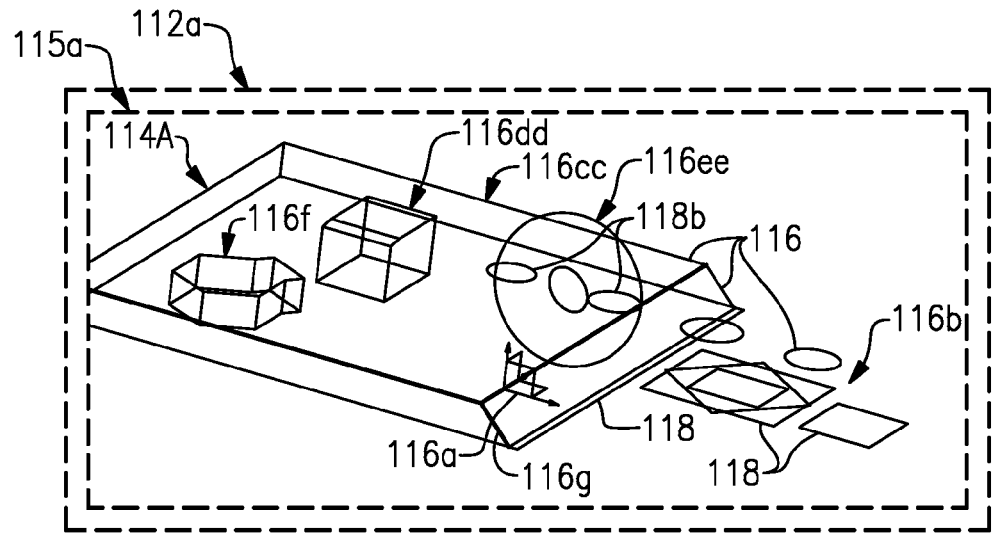
FIG. 2A illustrates a sample component design displayed in a first CAx environment, according to an embodiment.
Figure 2B:
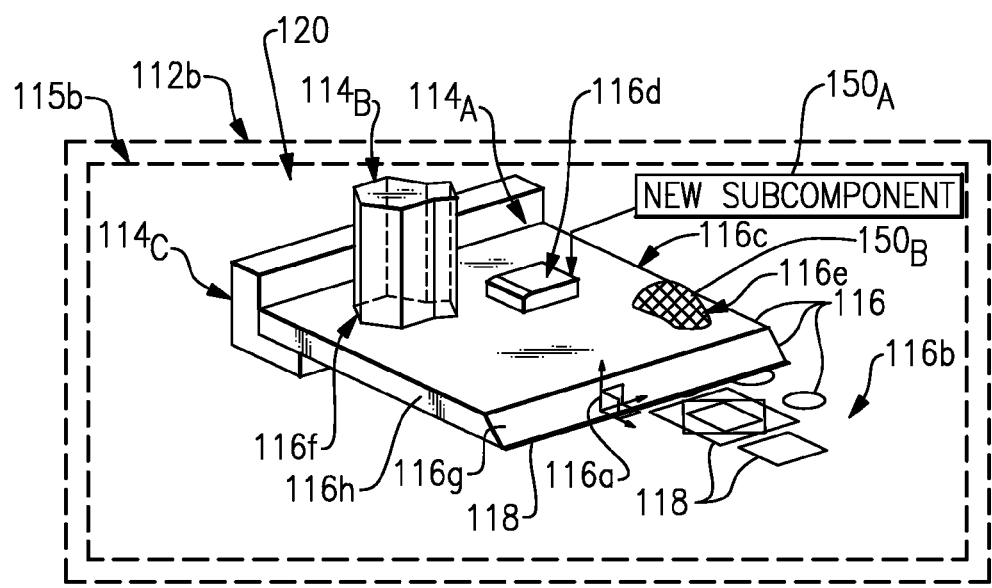
FIG. 2B illustrates a sample assembly model including the sample component design of FIG. 2A displayed in a second CAx environment, according to an embodiment.

FIGS. 2A-2B illustrate one embodiment in which two users collaborate on various aspects of an assembly or assembly model 120 including at least one component model or design 114, such as component design 114A, having at least one subcomponent feature 116. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example. In this scenario, the component design 114A is the active work part for each of the first and second CAx environments 112a, 112b such that each user is able to load, display and edit aspects of the component design 114A.

The example component design 114A includes one or more subcomponent features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrude 116c which is applied to one or more geometries 118 of the sketch 116b and is characterized by wireframe 116cc shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the extrude 116c feature. In some embodiments, the at least one subcomponent feature 116 is generated in response to execution of at least one command provided by the CAx environment 112 and corresponds to a group of feature types. In other embodiments, the features 116 are stored in one or more databases 109 and/or part files 113 as data representing the geometry of the features 116.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component model or design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b, according to an embodiment. As illustrated by the CAx environment 112a in FIG. 2A, the user has selected one or more visualization settings to show the wireframe geometries such as wireframe 116cc, 116ee and to hide the corresponding solid features 116c, 116e. In the CAx environment 112b shown in FIG. 2B, the user has selected one or more visualization settings to show solid features such as solids 116c, 116e and to hide wireframes such as corresponding wireframes 116c, 116e, for example. The visualization settings of each CAx environment 112 can be customized according to the needs of a particular situation even though each of the users is working on the same component design 114.

In some situations, a user provided with a CAx environment 112 desires to display, edit, and/or otherwise interact with two or more component designs 114 of an assembly model 120, such as component designs 114A, 114B, 114C shown in FIG. 2B, for example. In this illustrative embodiment, the second user provided with the second CAx environment 112b accesses data corresponding to an assembly model 120 from at least one database 109 (shown in FIG. 1) and stores the data as a local copy. In some embodiments, the assembly model 120 corresponds to a first part file 113A and each component design 114 corresponds to one or more different part files 113B (shown in FIG. 3) such that the second CAx environment 112b only accesses the first part file when accessing data corresponding to the assembly model 120 unless at least one predetermined condition is met, such as a checkpoint set for the corresponding component model(s) 114, for example.

The second CAx environment 112b designates the assembly model 120 as the active work part and displays the local copy of the assembly model 120 during an assembly session. The assembly model 120 is displayed in the CAx environment 112b based on the state of the data at the time the data was last accessed in the database 109. This technique of locally storing or caching data generally reduces data transfer requirements between the CAx environment 112b and the database 109 and improves system resource utilization, for example.

Another user provided with a CAx environment 112, such as the first user provided with the first CAx environment 112a, may create, edit or otherwise modify one of the component designs 114 stored in the database 109, such as component design 114A, during the assembly session of the second CAx environment 112b. For example, the first CAx environment 112a may edit the component design 114A to include a new subcomponent feature 116 such as wireframe 116dd, applied to geometry 118 of the sketch 116b, and wireframe 116ee. In this state, data corresponding to the component design 114A in the database 109 may be different from data stored in the local copy in the second CAx environment 112b. In some embodiments, the second CAx environment 112b is configured to update the local copy with changes to the component design 114A by reloading the corresponding part file into the second CAx environment 112b and setting the corresponding component design 114A as the active work part (rather than the assembly 120). Various techniques for updating changes to component design(s) and/or corresponding subcomponent feature(s) during an assembly session are contemplated.

Figure 3:
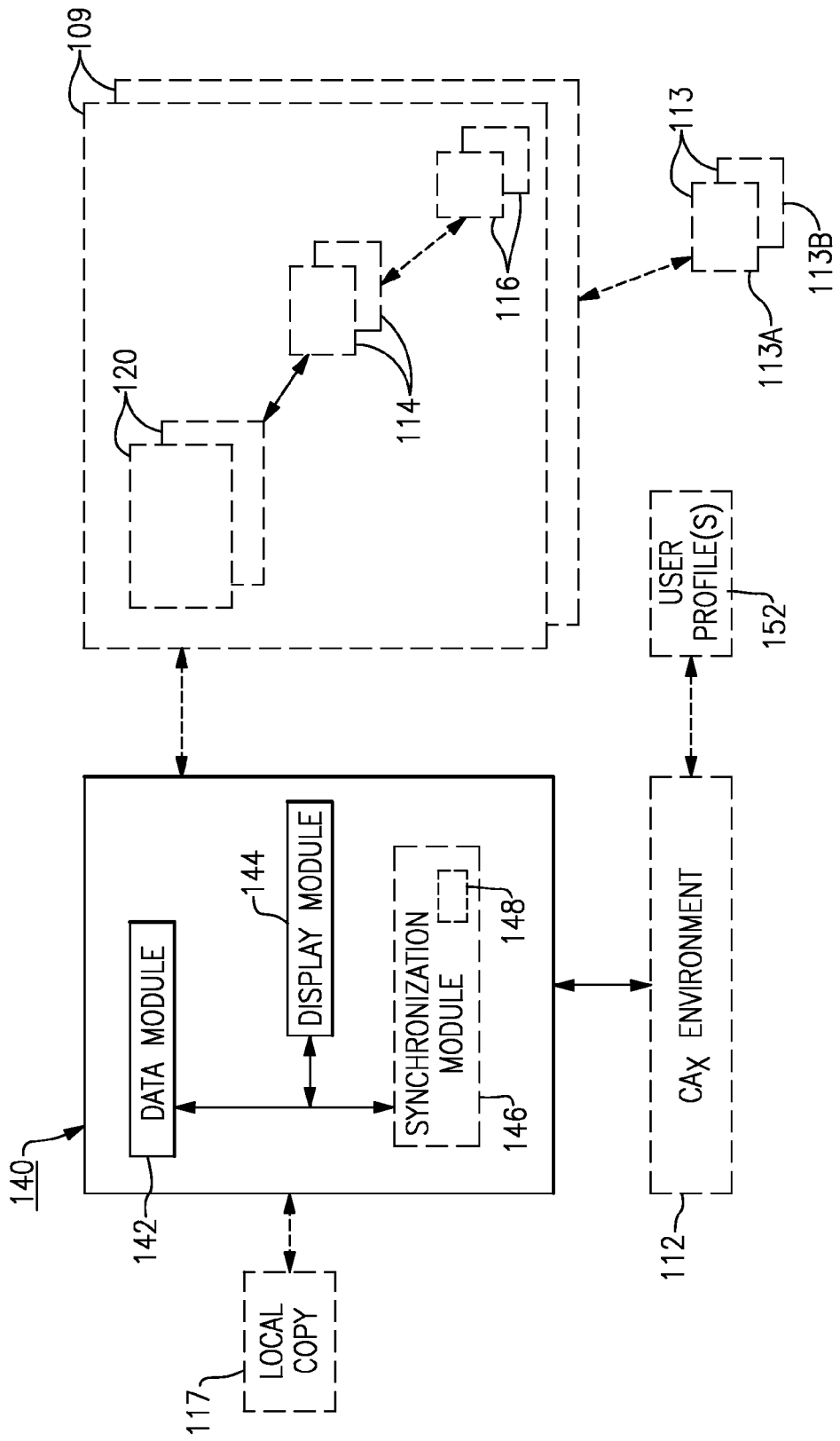
FIG. 3 illustrates a system for updating data corresponding to an assembly, according to an embodiment.

FIG. 3 illustrates a CAx package 140 for updating an assembly model, such as the assembly model 120 shown in FIG. 2B, according to an embodiment. The CAx package 140 is configured to update an assembly model 120 in response to changes made to the assembly model 120 by another CAx environment 112 during an assembly session. In some embodiments, the data corresponds to at least one component design 114 of the assembly model 120 and/or at least one subcomponent feature 116 in the database 109.

In some embodiments, the CAx package 140 is provided as a portion of a CAx software tool integrated into or with a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more assembly models 120 and/or component designs 114. Each of these modules includes executable software instructions and/or digital or analog hardware circuitry.

The CAx package 140 includes a data module 142 configured to access, retrieve and/or store data corresponding to one or more assembly models 120 and/or a component designs 114. In some embodiments, the data is stored in one or more databases 109 as one or more tables, records or entries. In other embodiments, the data is stored in one or more part files 113 and is accessible by referencing one or more objects or memory locations referenced by the one or more records or entries. In one embodiment, each part file 113 or record includes data corresponding to at least one subcomponent feature 116, such as any of the feature types discussed in this disclosure. In other embodiments, each database 109 organizes the data in one or more tables that include a list of part files 113 linked to a list of features 116 corresponding to an assembly model 120, component design 114 and/or part file 113, and linked to a list of feature types corresponding to the features 116, for example.

In one embodiment, the data module 142 is configured to create a local copy 117 of the data, which is updated or synchronized with modifications to various aspects of the assembly 120 utilizing various techniques. In an embodiment, the data module 142 is configured to cache data such that accessing the database 109 does not cause data corresponding to additions or changes to the component design(s) 114 and/or corresponding subcomponent feature(s) 116 in the local copy 117 to update unless at least one predefined condition is met.

In some embodiments, the CAx package 140 includes a display module 144. The display module 144 is configured to display data corresponding to an assembly model 120, one or more component models 114, and/or one or more subcomponent features 116 in a CAx environment 112, such as in one of the CAx environments 112a, 112b. In one embodiment, the display module 144 is configured to display data according to the local copy 117, such as during an assembly session.

In some embodiments, the data module 142 interfaces or otherwise communicates with a synchronization module 146 to provide the desired solution. The synchronization module 146 is configured to selectively cause the display module 144 to display data corresponding to changes to at least one subcomponent feature 116 caused by other CAx environments 112, such as the first CAx environment 112a, when at least one predetermined criterion is met. The changes may be made during an assembly session of the second CAx environment 112b, for example.

In some embodiments, the host computer 102 provides the synchronization module 146 as one or more software services. In another embodiment, each of the client computers 104 is operable to execute an instance of the synchronization module 146. In one embodiment, a single computing platform such as the host computer 102 or one of the client computers 104 is configured to execute the data module 142 and/or the synchronization module 146.

Various predetermined criteria for selectively displaying changes to an assembly model 120 and/or corresponding component design(s) 114 are contemplated. In one embodiment, at least one predetermined criterion is based on at least one manual selection in a CAx environment 112, such as a selection made in one or more graphical user interfaces (GUIs). In another embodiment, at least one predetermined criterion is based on at least one predetermined time threshold, such as an elapsed time since the data module 142 last accessed the database 109 and/or stored various data in the local copy 117. In yet another embodiment, the predetermined criterion is at least partially based on at least one of the component designs 114, subcomponent features 116, and/or group of feature types. For example, the second user provided with the second CAx environment 112b may indicate to receive updates to the first component design 114A during an assembly session, but not for another component design 114 such as the component designs 114B, 114C. In another embodiment, the second user may indicate to receive updates made by a particular user profile 152, group of profiles and/or CAx environments 112, but not for other user profile(s) 152 or CAx environments 112. In another embodiment, the at least one predetermined criterion is based on at least one of a unique name or identifier which corresponds to a particular assembly model 120, part file 113, component design 114 and/subcomponent feature 116.

In other embodiments, the synchronization module 146 determines whether to update the local copy 117 or otherwise cause the display module 144 to display changes to the subcomponent features 116 in the database 109 according to more than one predetermined criterion, such as any of those discussed in this disclosure. The at least one predetermined criterion can be set or otherwise designated by a user provided with the functionality of the CAx package 140, either manually during execution of a CAx environment 112, such as by one or more GUIs, or at system configuration or run-time, for example.

In some embodiments, the synchronization module 146 includes a listening module 148 configured to determine when changes to component design(s) 114 and/or corresponding subcomponent feature(s) 116 have been made in the database 109. The listening module 148 is configured to communicate with the database 109 and/or another module to provide the desired solution. In this arrangement, the at least one predetermined criterion is at least partially met when the listening module 148 determines that changes to at least one component design 114 and/or corresponding subcomponent features 116 have been made in the database 109. The listening module 148 can be configured to periodically poll the database 109 for changes, or receive notifications communicated from another CAx environment 112 and/or database 109, for example. In one embodiment, the at least one predetermined criterion relates to a user provided with the CAx environment 112 accepting at least one notification relating to the changes, which may be generated by the synchronization module 146 in embodiments where the synchronization module 146 is provided by the host computer 102.

In some embodiments, the synchronization module 146 is configured to cause the display module 144 to selectively display in a first mode data corresponding to a first set of features 116 created, changed or otherwise affected in the database 109 by another CAx environment 112 and to selectively display in a second mode data corresponding a second set of features 116 in the database 109 unaffected by the changes. In an embodiment, changes to component design 114A such as solids 116d, 116e (shown in FIG. 2B) corresponding to subcomponent features 116dd, 116ee (shown in FIG. 2A) may be displayed in a visually distinct manner from other subcomponent features 116 in the second CAx environment 112b during the assembly session. In an embodiment, a user provided with a CAx environment 112 is able to toggle on and off the display of each of the first set and second set of subcomponent features 116 in the CAx environment 112 during an assembly session, for example.

In another embodiment, the synchronization module 146 is configured to cause the display module 144 to display at least one visual indicator 150 relating to changes to component design(s) 114 and/or corresponding subcomponent feature(s) 116 caused by another CAx environment 112, such as the first CAx environment 112a during the assembly session of the second CAx environment 112b. In an embodiment, the visual indicator 150 is a label or other textual description 150A. In another embodiment, the visual indicator 150 relates to geometry of the subcomponent feature(s) 116 modified in the database 109, such as surface coloring, transparency, shading or texturing 150B, for example. It should be appreciated that various aspects of each mode can be configured according to the needs of a particular situation.

FIG. 4 illustrates an algorithm 160 in a flowchart for updating data corresponding to various aspects of an assembly, utilizing any of the techniques described in this disclosure and the CAx package 140 shown in FIG. 3 according to the process flow of FIG. 4. In some embodiments, the algorithm 160 is executed within a multi-user CAx environment, such as CAx environment 112b shown in FIG. 2B.

At block 162 a CAx environment accesses data corresponding to an assembly model from at least one database. In some embodiments, at least one part file corresponding to the assembly model is accessed at block 164. At block 166 a local copy of the data corresponding to the assembly model is stored in the CAx environment, as a separate and distinct part file, for example. The algorithm 160 causes the CAx environment to display data corresponding to the local copy during an assembly session at block 168.

At block 170 the algorithm 160 evaluates or otherwise determines whether a new or modified component design and/or corresponding subcomponent feature(s) meets the at least one predetermined criterion, including any of the criteria disclosed herein. The at least one predetermined criterion can be set during system configuration, or can be manually selected by a user provided with a CAx environment utilizing any of the techniques described in this disclosure, for example. In some embodiments, the algorithm 160 causes the CAx environment to display during the assembly session data according to the local copy, such that changes caused by another CAx environment are not displayed during the assembly session.

At block 172 the algorithm 160 selectively causes the CAx environment to display during the assembly session data corresponding to changes to component design and/or corresponding subcomponent feature(s) caused by another CAx environment during the assembly session when at least one predetermined criterion is met. In an embodiment, block 172 includes updating the local copy with data corresponding to the changes when the at least one predetermined criterion is met. In some embodiments, block 172 includes selectively displaying the subcomponent features according to one or more modes, which may include one or more visual indicators, using any of the techniques of this disclosure.

The algorithm 160 can be programmed in the CAx software directly, provided as one or more software plug-ins adapted to work with the native CAx software, or provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running a multi-user CAx environment 112 can be programmed with multiple additional tools, and the various features and tools included can be configured to interoperate with each other according to known principles.

Although the discussed embodiments illustrate a specific component, embodiments of this disclosure are not limited to those particular combinations. One skilled in the art having the benefit of this disclosure will recognize that it is possible to use some of the components or features from one of the embodiments in combination with features or components from another one of the embodiments. Furthermore, various embodiments may include one or more alternative sub-embodiments within them, while other embodiments may include a different subset of embodiments. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
   a computing device including a processor and a memory storage device, the processor being configured to execute a first multi-user CAx environment including a synchronization module, the synchronization module is configured to selectively cause a display module at a first multi-user CAx environment to display data corresponding to changes to at least one subcomponent feature of a first component model of an assembly model caused by a second multi-user CAx environment during an assembly session when at least one predetermined criterion is met, the assembly model including the first component model and a second, different component model, a local copy of the assembly model loaded in the first multi-user CAx environment during the assembly session;
   wherein the at least subcomponent feature is generated in response to execution of at least one command corresponding to a group of feature types; and
   wherein the at least one subcomponent feature includes a first set of subcomponent features unaffected by the changes and a second set of subcomponent features relating to the changes, and the synchronization module causes the display module to display in a first mode the first set, but causes the display module to display in a second mode the second set in response to user interaction in the first CAx environment toggling on and off the display of each of the first set and second set during the assembly session.

2. The system as recited in claim 1, comprising a data module configured to access data relating to the assembly model from at least one database and configured to store a local copy of the assembly model in the first multi-user CAx environment, and wherein the display module is configured to display the assembly model according to the local copy.

3. The system as recited in claim 2, wherein the data module is configured to cache data corresponding to the assembly model such that accessing the assembly model from the at least one database does not cause data corresponding to the at least one subcomponent feature in the local copy to update unless at least one predefined condition is met.

4. The system as recited in claim 2, wherein the assembly model corresponds to a first part file, and the at least one subcomponent feature corresponds to a second part file, the second part file being different from the first part file.

5. The system as recited in claim 1, wherein the at least one predetermined criterion is based on at least one manual selection in the first multi-user CAx environment.

6. The system as recited in claim 1, wherein the at least one predetermined criterion is based on at least one predetermined time threshold.

7. The system as recited in claim 1, wherein the synchronization module includes a listening module configured to determine when changes to the at least one subcomponent feature have been made in at least one database configured to store the assembly model.

8. The system as recited in claim 7, wherein the synchronization module is configured to compare a first time parameter relating to the changes with a second time parameter relating to a local copy of data corresponding to the at least one subcomponent.

9. The system as recited in claim 8, wherein the at least one predetermined criterion is met when values of the first time parameter and the second time parameter are different.

10. The system as recited in claim 1, wherein the synchronization module is configured to cause the display module to display at least one visual indicator relating to the changes to the at least one subcomponent feature caused by the second multi-user CAx environment during the assembly session.

11. The system as recited in claim 10, wherein the visual indicator relates to a geometry of the at least one subcomponent feature.

12. A system for collaborating on a component, comprising:
   at least one client multi-user CAx environment including a data module and a display module, the data module configured to store a local copy of data corresponding to an assembly model from at least one database, the assembly model including a first component model and a second, different component model, the first component model having at least one subcomponent feature, the display module configured to display data corresponding to the local copy during an assembly session; and
   a host server including a processor and a memory storage device, the processor being configured to execute a host multi-user CAx environment having a synchronization module, the memory storage device being configured to store the at least one database accessible by the host multi-user CAx environment, and the synchronization module being configured to selectively cause the data module during the assembly session to update the local copy with data corresponding to changes to the at least one subcomponent feature in the at least one database when at least one predetermined criterion is met;
   wherein the at least subcomponent feature is generated in response to execution of at least one command corresponding to a group of feature types; and
   wherein the at least one subcomponent feature includes a first set of subcomponent features unaffected by the changes and a second set of subcomponent features relating to the changes, and the synchronization module causes the display module to display in a first mode the first set, but causes the display module to display in a second mode the second set in response to user interaction in the first CAx environment toggling on and off the display of each of the first set and second set during the assembly session.

13. The system as recited in claim 12, wherein the at least one predetermined criterion corresponds to the at least one client multi-user CAx environment accepting at least one notification from the synchronization module relating to the changes.

14. The system as recited in claim 12, wherein at least one of the first mode and the second mode includes at least one visual indicator relating to a geometry of the at least one subcomponent feature.

15. A method for collaborating on a component design, comprising the steps of:
   storing a local copy of data corresponding to an assembly model from at least one database, the assembly model including a first component model and a second, different component model, the first component model having at least one subcomponent feature;
   displaying data corresponding to the local copy at the beginning of an assembly session in a first multi-user CAx environment;
   selectively displaying during the assembly session data corresponding to changes to the at least one subcomponent feature caused by a second multi-user CAx environment during the assembly session when at least one predetermined criterion is met;
   wherein the at least subcomponent feature is generated in response to execution of at least one command corresponding to a group of feature types;
   wherein the at least one subcomponent feature includes a first set of subcomponent features unaffected by the changes and a second set of subcomponent features relating to the changes; and
   causing the display module to selectively display in a first mode data the first set, but to selectively display in a second mode the second set in response to user interaction in the first CAx environment toggling on and off the display of each of the first set and second set of subcomponent features during the assembly session.

16. The method as recited in claim 15, wherein at least one of the first mode and the second mode includes at least one visual indicator relating to a geometry of the at least one subcomponent feature.

17. The method as recited in claim 15, comprising:
   updating the local copy with data corresponding to the changes when the at least one predetermined criterion is met; and
   wherein the step of selectively displaying includes displaying each of the at least one subcomponent according to the local copy.

18. The system as recited in claim 11, wherein the visual indicator includes transparency of the geometry of the at least one subcomponent feature.

19. The system as recited in claim 14, wherein the assembly model corresponds to a first part file, the at least one subcomponent feature corresponds to a second, different part file, and the second component model corresponds to a third, different part model.

20. The method as recited in claim 17, wherein the assembly model corresponds to a first part file, the at least one subcomponent feature corresponds to a second, different part file, and the second component model corresponds to a third, different part model.

* * * * *

UNITED STATES PATENT AND TRADEMARK OFFICE
CERTIFICATE OF CORRECTION

PATENT NO. : 9,965,572 B1  
APPLICATION NO. : 14/596599  
DATED : May 8, 2018  
INVENTOR(S) : Joshua Daniel Winn et al.

Page 1 of 1

It is certified that error appears in the above-identified patent and that said Letters Patent is hereby corrected as shown below:

In the Claims

In Claim 1, Column 12, Line 11; replace "the at least subcomponent" with --the at least one subcomponent--

In Claim 12, Column 13, Line 27; replace "the at least subcomponent" with --the at least one subcomponent--

In Claim 12, Column 13, Line 37; replace "the first CAx environment" with --the at least one client CAx environment--

In Claim 15, Column 14, Line 14; replace "the at least subcomponent" with --the at least one subcomponent--

In Claim 15, Column 14, Line 22; replace "mode data" with --mode--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*